United States Patent Office 3,810,952
Patented May 14, 1974

3,810,952
LIQUID COPOLYMERS OF 1,3-BUTADIENE AND 1-MONOOLEFINS, THEIR PREPARATION AND USES
Jean-Pierre Durand, Chatou, and Francois Dawans, Bougival, France, assignors to Institut Francais du Petrole des Carburants et Lubrifiants
No Drawing. Filed Sept. 19, 1972, Ser. No. 290,405
Claims priority, application France, Sept. 23, 1971, 7134350
Int. Cl. C07c 11/00
U.S. Cl. 260—677 R    9 Claims

ABSTRACT OF THE DISCLOSURE

Liquid copolymers of 1,3-butadiene with one or more 1-monoolefin(s) are disclosed. They are constituted of olefinic and butadiene units, among which at least 80% cis-1,4 butadiene units. Their intrinsic viscosity at 30° C. in toluene is from 0.02 to 1.0 dl./g. Their preparation involves the use as catalyst of a nickel fluorocarboxylate halide, particularly nickel trifluoroacetate chloride. They are useful for many industrial applications.

---

This invention relates to liquid copolymers of 1,3-butadiene and 1-monoolefins.

Processes for copolymerizing 1,3-butadiene and 1-monoolefins are already known. They result in the production of polymeric substances having an average molecular weight by number generally higher than 20,000, always higher than 5,000, and a content of cis-1,4 unsaturation in most cases lower than 80 percent of the total unsaturation. Such processes generally involve the use of catalysts of the Ziegler type, which comprises at least two metal compounds.

An object of this invention is to provide copolymers of 1,3-butadiene and 1-monoolefins which are liquid (having generally an average molecular weight by number lower than that of the copolymers of the prior art) and exhibit a higher content of cis-1,4 unsaturation.

A further object of this invention is to provide copolymers which may be produced at high conversion rates by an economical catalytic process involving as the catalyst only one monometallic compound.

The process for manufacturing the liquid copolymers of this invention is advantageous particularly in that it may use, as a starting material, industrial products, for example mixtures, rich in butane, butenes and butadienes, that result from the steamcracking of naphthas or from the dehydrogenation of butane and butenes. It is further advantageous in that it allows the manufacture of polymeric substances of low molecular weights, substantially free from polymeric products which would be solid at room temperature; consequently, the product prepared by this process does not have to be fractionated before its further use. The process for manufacturing the liquid copolymers of this invention is further advantageous in that it leads to the obtainment of liquid polymeric products having a low molecular weight dispersity (i.e. a narrow molecular weight distribution).

Other objects and advantages of this invention will appear to those skilled in the art from the following description thereof.

The products of this invention are liquid copolymers of 1,3 butadiene and one or more 1-monoolefin(s), the microstructure of which consists essentially of olefinic units, wherein at least 80%, and, in most cases, from 85 to 92% of the total unsaturation consists of cis-1,4 butadiene units. (Said total unsaturation may be varied within a relatively wide range; it is generally from 25 to 99% and, in most cases, from 50 to 96% of the total number of monomeric units.)

They usually have a viscosity at 25% C. lower than 500 poises.

Their intrinsic viscosity at 30° C. in toluene is generally from 0.02 to 1.0 dl/g., and preferably from 0.02 to 0.4 dl/g. Their average molecular weight by number is usually lower than 40,000 and, in most cases, from 1,000 to 5,000.

Also, their molecular weight dispersity, defined as the

ratio, is generally lower than 4 and, in most cases, from 1.5 to 3.

They further present, due to their particular microstructure, good properties at low temperatures, i.e. a glass-transition temperature, generally lower than —60° C., for example from —110 to —60° C. and, in most cases, from —105 to —85° C.

These liquid copolymers are useful as plasticizers in the preparation of thermoplastics, as siccative agents in coatings, as additives for adhesive compositions, as stabilizers for soils, as additives for lowering the filterability point and the pour point of liquid combustibles and as additives for improving the viscosity index of engine lubricating oils, as well as in many other applications.

The process for manufacturing the liquid copolymers of this invention comprises reacting, in the liquid phase, 1,3-butadiene with one or more 1-monoolefin(s) in the presence of at least one haloderivative of a nickel fluorocarboxylate conforming to the general formula $$(CfCOO)NiX \qquad (I)$$

in which X is a halogen atom and Cf is an alkyl group in which at least the carbon atom which is next to the carboxylic group is substituted with at least a fluorine atom.

Said Cf group in Formula I may particularly be:

—CH$_2$F; —CHF$_2$; —CF$_3$; —CCl$_2$F; —CHF—CH$_3$;
—CF$_2$—CF$_3$; or —CF$_2$—CF$_2$—CF$_3$.

Specific examples of nickel compounds that may advantageously be used as the catalyst, as such or in and admixture, are the following:

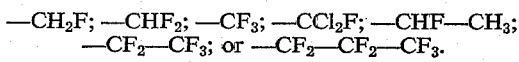

These haloderivatives of nickel fluorocarboxylates are easily prepared according to well known processes, for example according to the methods described in the French Pat. 1,601,121 corresponding to the Application for U.S. patent Ser. No. 862,948, filed Oct. 1, 1969 now U.S. Pat. No. 3,739,003. For example, a nickel fluorocarboxylate of formula:

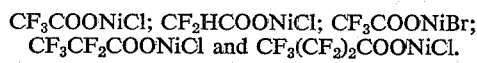

is partially reacted with a halogenation agent, preferably in a solvent of said nickel fluorocarboxylate, e.g. an ether or a diether.

The compound formed may combine with one or more molecules of solvent, for example diethyl ether. A treatment under vacuum at a temperature between 20 and 250° C. is convenient for eliminating these combined molecules.

Any halogenation agent may be used, for example $PX_5$, $PX_3$, $POX_3$, halide of a carboxylic acid (aromatic, cycloaliphatic or aliphatic), $SOX_2$, $X_2$, where X may be F, Cl, Br or I. The most favorable are those which are soluble or miscible with the solvent used in the manufacture, or the products of which, after chlorination, are soluble or miscible with this solvent. Thionyl halides are particularly interesting for manufacturing these compounds.

The halogenation agent may be used in a stoichiometrical amount or in a different amount, according to the desired conversion rate of the reactants.

The halogenation temperature is dependent, in part, on the agent employed. It generally lies in the range from $-20$ to $+100°$ C.

The catalyst preferred in this invention is nickel trifluoroacetate chloride. It is easily available from the corresponding etherate of the formula:

$$CF_3COONiCl.O(C_2H_5)_2,$$

prepared, in turn, by a method such as described hereabove, and has a high catalytic activity.

According to a specific embodiment of the process for manufacturing the liquid copolymers of this invention, the nickel compound is reacted, optionally in the presence of an inert solvent, with an amount of 1,3-butadiene at least stoichiometrical, before it is contacted with the mixture of the monomers to be copolymerized.

According to another specific embodiment, the catalytic compound is an etherate of a nickel perfluorocarboxylate halide and the process comprises three successive steps, as follows:

(a) a first step in which solvated molecules of diethyl ether, if present, are eliminated from the nickel compound, for example by a heating at a temperature of from 30 to 120° C., under reduced pressure, during 1 to 60 minutes;

(b) a second step in which the product resulting from said first step is reacted, in the optional presence of an inert diluent, with 1,3 butadiene, preferably in such amounts that the molar ratio 1,3 butadiene/nickel compound is from 5:1 to 30:1;

(c) a third step in which the product resulting from said second step is reacted with a mixture of olefins containing from 20 to 90% by weight of 1,3 butadiene.

According to a further embodiment of the process for manufacturing the liquid copolymers of this invention, the nickel compound, made free from solvated ether if necessary, is reacted in the presence or in the absence of an inert solvent with the totality of the 1-monoolefin(s) to be reacted and with only a part of the 1,3-butadiene to be reacted. The remaining amount of the 1,3-butadiene is thereafter added stepwise or, preferably, continuously, while the polymerization occurs. By this method, polymers having an average molecular weight by number lower than 2000 and a low molecular weight dispersity are obtained:

The nickel fluorocarboxylate derivative may be used in various concentrations. Concentrations ranging from $0.5 \times 10^{-3}$ to $5 \times 10^{-2}$ moles per liter of the reaction solution are generally convenient, but it is nevertheless possible to use concentrations outside of this range.

The copolymerization reaction may be effected under autogenous pressure or under any pressure sufficient for maintaining the reaction mixture substantially in the liquid phase. The pressure value selected depends on the nature of the particular diluent used and the temperature at which the polymerization is effected.

The polymerization is preferably conducted in a medium substantially consisting in one or more hydrocarbon(s) selected among the aliphatic and cycloaliphatic saturated hydrocarbons, the halogenated aliphatic hydrocarbons and the aromatic or halogenated aromatic hydrocarbons that are liquid at the polymerization temperature used.

Examples of diluents particularly preferred are: hexane, heptane, octane, cyclohexane, benzene, toluene, xylene, methylenechloride, dichloroethane, chlorobenzene, 1,3-dichlorobenzene and mixtures thereof.

The reaction temperature is, in most cases, from 0 to 120° C., although it is possible to operate at temperature outside said range. However, preferred temperatures are from 30 to 80° C. By the process as described hereinabove, 1,3-butadiene may be copolymerized with one or more 1-monoolefins, in the optional presence of other diolefins and monoolefins. More in particular, liquid copolymers may be prepared from 1,3-butadiene with ethylene, propylene, 1-butene, isobutene, 1-pentene and 1-hexene.

The respective amounts of 1,3-butadiene and 1-monoolefin(s) in the starting mixture, may be varied within a relatively wide range and essentially are a function of the unsaturation desired for the end products. The relative amount of 1,3-butadiene is generally from 20 to 90% and, in most cases, from 30 to 60% by weight of the starting mixture of olefins.

When the copolymerization is effected batchwise, at the end of the reaction, the total reaction mixture is subjected to any convenient method for deactivating the catalyst and for recovering the polymeric product. For example, the copolymer may be recovered by steam-distilling of the diluent contained therein. The copolymer may also be precipitated by addition of a substance such as an alcohol or water; it is thereafter recovered by settling or centrifiguration.

The elimination of the catalytic residues is obtained most efficiently by adding to the reaction mixture small amounts of an agent of chelation for nickel, such as acetylacetone or the disodium salt of ethylenediamino tetraacetic acid, and eventually extracting the compounds thus formed by means of a convenient solvent, before the polymeric product is recovered.

The following examples are illustrative; they are not intended to limit the scope of the invention.

EXAMPLE 1

400 cm.³ (cc.) of 1,2-dichlorobenzene and 52 g. of 1,3-butadiene are added to 8.28 g. of nickel trifluoroacetate chloride ($CF_3COONiCl$) prepared by heating the corresponding etherate at 120° C. under vacuo, for 30 minutes. The resulting mixture is stirred at 50° C. during 75 minutes. 156 g. of a C₄-cut from steam-cracking, which has been made free from acetylenic and allenic compounds and contains (by weight):

|  | Percent |
|---|---|
| Butadiene | 32.6 |
| Monoolefins (1- and 2-butene+isobutene) | 61.2 |
| Propane, butane and isobutane | 6.2 | is added to 120 cm.³ of the mixture formed previously. After 26 hours of stirring at 50° C., 77 g. of a polymeric product having an intrinsic viscosity as determined at 30° C. in toluene of 0.20 dl/g. is obtained. This product presents an unsaturation of about 80% and a microstructure of butadiene units, as determined by IR-spectrometry, composed of cis-1,4 units:90%, trans-1,4 units:5% and 1,2-units:5%.

EXAMPLE 2

Example 1 is repeated except that the reaction mixture is now stirred at 70° C. for 8 hours. The polymeric product obtained (74 g.) has a intrinsic viscosity at 30° C. in toluene of 0.23 dl/g., an unsaturation of 73% and the same microstructure of butadiene units as the product prepared in Example 1.

EXAMPLE 3

120 cm.³ of 1,2-dichloroethane and 156 g. of a C₄-cut from steam-cracking, previously subjected to a selective hydrogenation of the acetylenic compounds and containing, by weight:

| | Percent |
|---|---|
| 1,3-butadiene | 35.5 |
| C₄ saturated hydrocarbons | 2.0 |
| C₄ olefinic hydrocarbons | 58.2 |
| Other | 4.3 | is added to 2.07 g. of nickel trifluoroacetate chloride (CF₃COONiCl), obtained by heating the corresponding etherate at 120° C. under vacuo for 30 minutes. After 2 hours of stirring at 80° C., 58 g. of a polymer is obtained. This product has an average molecular weight by number ($\overline{Mn}$), as determined by Vapor Pressure Osmometry, of 1010. Its content in butadiene units, as determined by Nuclear Magnetic Resonance is from 40 to 50% and the miscrostructure thereof, as determined by I.R. spectrometry is composed of cis-1,4 units:87%, trans-1,4 units:8% and 1,2-units:5%. Its glass-transition point, as determined by differential thermal analysis is −101° C.

EXAMPLE 4

Example 3 is repeated, except that benzene is substituted for 1,2-dichloroethane. The operating conditions being unchanged, 65 g. of a liquid product having an average molecular weight by number $\overline{Mn}$ of 1220 is obtained. This product presents the same characteristics as the product prepared in Example 3.

EXAMPLE 5

240 cm.³ of 1,2-dichloroethane, 150 g. of the same C₄-cut as used in Example 3 and 156 g. of 1,3-butadiene are added to 4.14 g. of nickel trifluoroacetate chloride (CF₃COONiCl) obtained in the same manner as described is said Example 3. After 4 hours of stirring at 80° C., 193 g. of a liquid product is obtained. This product contains, as shown by a NMR determination, 85% of butadiene units, the microstructure of which is composed of cis-1,4 units:91%; trans 1,4-units:4% and 1,2-units:5%. Its average molecular weight by number is 1600.

EXAMPLE 6

120 cm.³ of 1,2-dichloroethane, 52 g. of 1,3-butadiene and 52 g. of isobutene are added to 2.07 g. of nickel trifluoroacetate chloride (CF₃COONiCl). After 2 hours of stirring at 80° C., 70 g. of a polymeric product containing 45% of unsaturation (as determined by NMR) is obtained. The microstructure of the butadiene units is composed of cis-1,4 units:87%; trans 1,4-units–8% and 1,2-units 5%. The glass-transition point of the polymer is −101° C.

EXAMPLE 7

Example 6 is repeated with substituting 1-butene for isobutene. Under the same operating conditions as in said Example 6, 44 g. of a polymer having an average molecular weight by number ($\overline{Mn}$) of 2000 and containing 88% of butadiene units (cis-1,4:87%, trans-1,4:8% and 1,2-units:5%) is obtained.

EXAMPLE 8

In a reaction vessel, 2.5 g. of the etherate of nickel perfluoropropionate chloride of the formula $$CF_3CF_2COONiCl, 5[(C_2H_5)_2O]$$

are heated at 100° C., under reduced pressure, for 30 minutes. After the reaction vessel has been cooled, 200 cm.³ of chlorobenzene, 21 g. of 1,3-butadiene and 25 g. of 1-pentene are introduced thereinto. The reaction mixture is stirred at 70° C. for 4 hours. The polymer recovered (30 g.) has an unsaturation of about 66% and an intrinsic viscosity as determined at 30° C. in toluene, lower than 0.15 dl./g.

EXAMPLE 9

500 cm.³ of 1,2-dichloroethane, 990 g. of 1-butene and 793 g. of 1,3-butadiene are added to 8.28 g. of nickel trifluoroacetate chloride CF₃COONiCl, prepared as described in Example 3; after 150 minutes of stirring at 60° C., a liquid polymer having an average molecular weight by number ($\overline{Mn}$) of 2400 and containing 96% of unsaturation is obtained. The microstructure of the butadiene units is composed of cis-1,4 units:88%, trans-1,4- units: 8% and 1,2-units:4%. The kinematic viscosity of this polymer, determined at 37.8° C. by means of a "Houillon"-Viscosimeter, is 1800 cSt. The dispersity of the molecular weight, expressed as the $\overline{Mp}/\overline{Mn}$ ratio as determined by Gel Permeation Chromatography, is about 4. ($\overline{Mp}$ is the average molecular weight by weight).

EXAMPLE 10

500 cm.³ of 1,2-dichloroethane, 1120 g. of 1-butene and 435 g. of 1,3-butadiene are added to 8.28 of nickel trifluoroacetate chloride (CF₃COONiCl). After 90 minutes of stirring at 65° C., 350 g. of 1,3-butadiene are added to the resulting mixture and the stirring is continued for 2 hours at the same temperature. 560 g. of a liquid polymer having an average molecular weight by number ($\overline{Mn}$) of 1800 and containing 95% of unsaturation is obtained. The microstructure of the butadiene-units is composed of cis-1,4 units:86%, trans-1,4 units.10% and 1,2-units:4%. The kinematic viscosity, as determined at 37.8° C. by means of a "Houillon" Viscosimeter, is 480 cSt. The molecular weight dispersity $\overline{Mp}/\overline{Mn}$, as determined by Gel Permeation Chromatography, is about 2.7.

What we claim as our invention is:

1. A process for manufacturing a liquid copolymer comprising reacting, in the liquid phase, 1,3-butadiene and at least one 1-monoolefin, in the presence of at least one nickel fluorocarboxylate halide conforming to the general formula $$(CfCOO)NiX$$

in which X is a halogen atom and Cf is an alkyl group in which at least the carbon atom which is next to the carboxylic group is substituted with at least a flourine atom.

2. A process as claimed in claim 1, in which the mixture of olefins to be copolymerized contains from 30 to 60% of 1,3-butadiene.

3. A process as claimed in claim 1, in which the mixture of olefins to be copolymerized contains from 30 to 60% of 1,3-butadiene.

4. A process as claimed in claim 1, in which the mixture of olefins to be copolymerized consists in a C₄-hydrocarbon cut containing 1,3-butadiene and at least a butene selected from the group consisting of 1-butene and isobutene.

5. A process as claimed in claim 1, in which the nickel fluorocarboxylate halide is reacted with an amount of 1,3-butadiene at least stoichiometrical, before it is contacted with the mixture of olefins to be copolymerized.

6. A process as claimed in claim 1, comprising the successive steps of (a) heating an etherate of a nickel perfluorocarboxylate halide at a temperature of from 30 to 120° C. under reduced pressure for 1 to 60 minutes, (b) reacting the product resulting from said step (a) with an amount of 1,3 butadiene such that the molar ratio 1,3 butadiene:nickel compound is from 5:1 to 30:1 and (c) reacting the product resulting from said step (b) with a mixture of olefins containing from 20 to 90% by weight of 1,3 butadiene.

7. A process as claimed in claim 1, in which the nickel fluorocarboxylic halide is first reacted with the totality of the 1-monoolefin and with a part of the 1,3-butadiene to be copolymerized, the remaining part of the 1,3-butadiene being added while the copolymerization occurs, said process resulting in the production of a liquid copolymer having an average molecular weight by number lower than 2000.

8. A process as claimed in claim 1, in which the copolymerizing is effected in an inert diluent.

9. A process as claimed in claim 1, in which the nickel fluorocarboxylate halide used is nickel trifluoroacetate chloride.

References Cited

UNITED STATES PATENTS

| | | | |
|---|---|---|---|
| 3,392,209 | 7/1968 | Schneider | 260—677 |
| 3,392,208 | 7/1968 | Schneider II et al. | 260—677 |
| 3,739,003 | 6/1973 | Codet et al. | 260—439 |

DELBERT E. GANTZ, Primary Examiner

J. M. NELSON, Assistant Examiner

U.S. Cl. X.R.

260—680, 683.15, 666 B